C. H. BLOMSTROM.
DRIVING MECHANISM FOR MOTOR VEHICLES.
APPLICATION FILED MAR. 1, 1915.

1,187,964.

Patented June 20, 1916.
2 SHEETS—SHEET 1.

WITNESSES:
L. S. Woodhull.

INVENTOR
Carl H. Blomstrom.
BY
ATTORNEY

UNITED STATES PATENT OFFICE.

CARL H. BLOMSTROM, OF DETROIT, MICHIGAN, ASSIGNOR TO EDWIN J. KRUCE, OF DETROIT, MICHIGAN.

DRIVING MECHANISM FOR MOTOR-VEHICLES.

1,187,964.  Specification of Letters Patent.  Patented June 20, 1916.

Application filed March 1, 1915. Serial No. 11,181.

*To all whom it may concern:*

Be it known that I, CARL H. BLOMSTROM, a citizen of the United States, residing at Detroit, in the county of Wayne, State of Michigan, have invented certain new and useful Improvements in Driving Mechanism for Motor-Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to driving mechanism especially adapted for use upon motor vehicles, and consists in the novel construction and arrangement of parts hereinafter fully set forth and pointed out in the claims.

The invention has for its principal object the provision of simple and efficient means for effecting a driving connection between the motor and the front wheels of the vehicle in such manner as to permit of the turning of said wheels for the purpose of steering the vehicle without interfering with the transmission of the driving power thereto.

The invention further contemplates the embodiment in the construction of such features of advantage as will enable the direct application of the power to the driven wheels in a manner to dispense with the use of the ordinary axle with its differential gear and housing, thereby relieving the wheels and tires of this direct weight, and at the same time gaining greater road clearance.

To simplify and combine the parts of the mechanism in compact and conveniently accessible form and so shorten the driving shaft as to reduce the torque strain thereon; to enable the mounting of the engine and driving mechanism in unit form upon a spring supported frame so as to provide adequate spring action therefor and permit the maintenance of effective driving connection with the wheels; to enable the cambering of the wheels of the vehicle and to secure greater tractive application of the driving power and increased efficiency in the general control and operation of the vehicle, are other objects.

Figure 2:
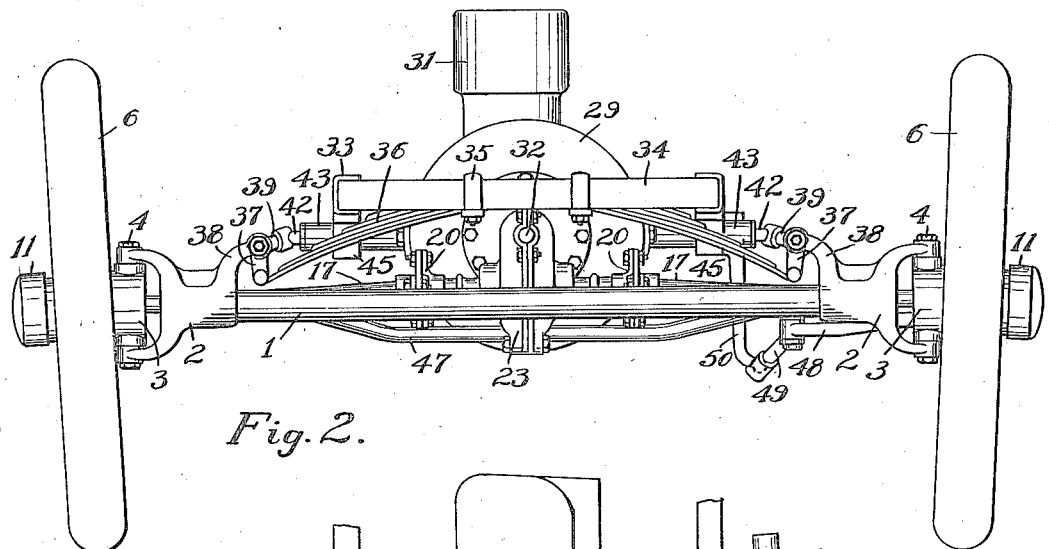
Figure 1:
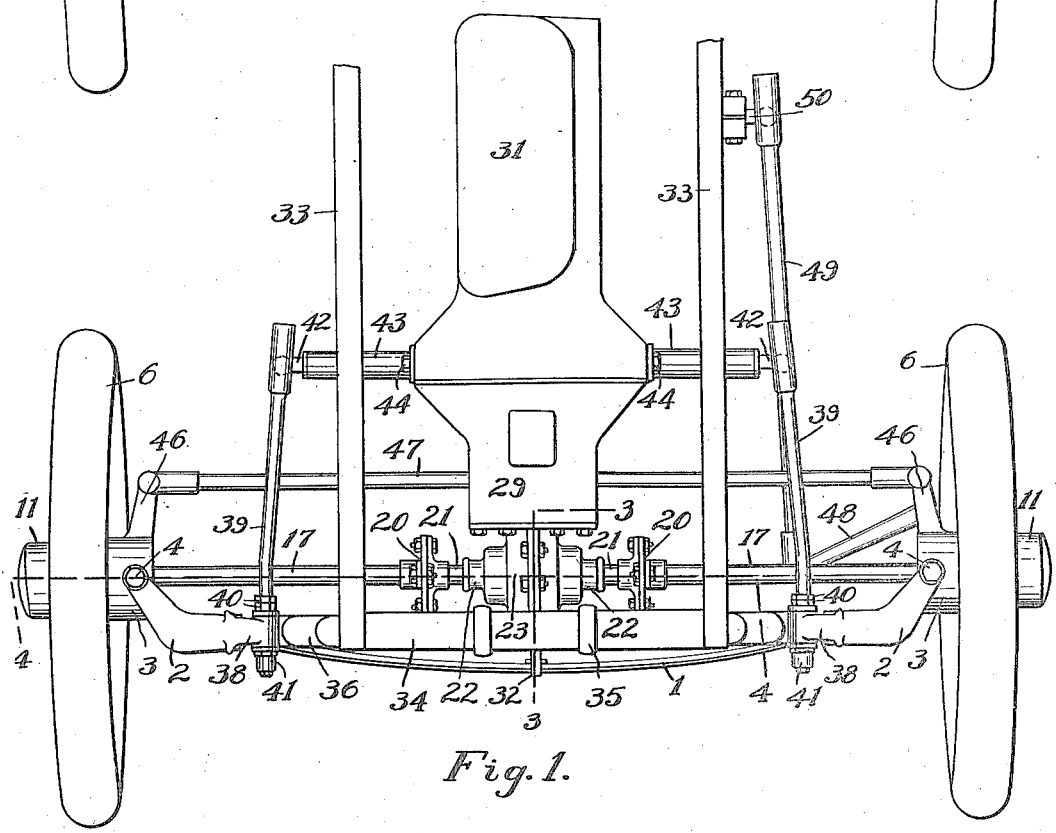
Figure 4:
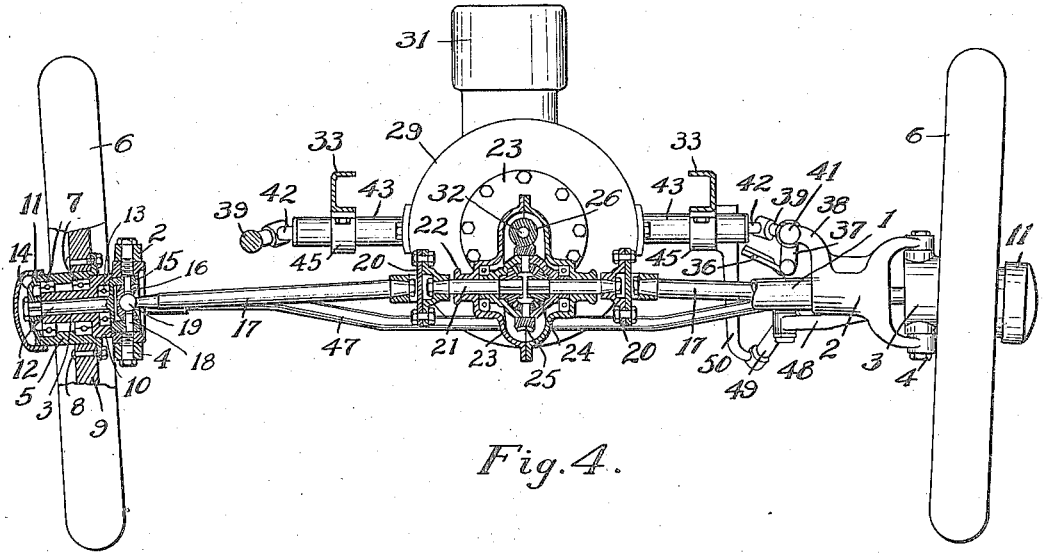
Figure 3:
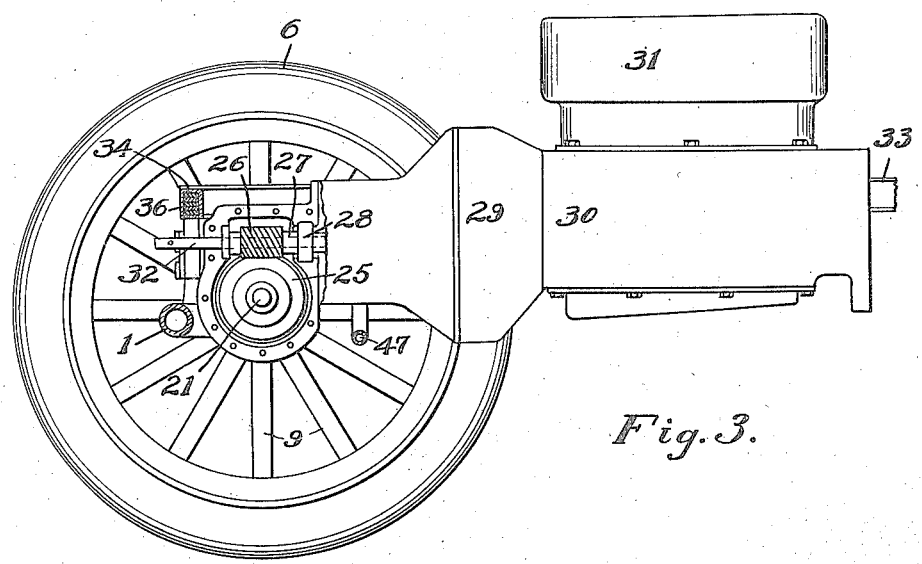

The above objects and advantages are attained by the employment of the mechanism illustrated in the accompanying drawings, in which:

Figure 1 is a fragmentary plan view of the front portion of the vehicle, showing the front axle having forked offset pivotal connections with the front wheels, the engine and driving mechanism mounted on a spring supported frame, flexible shaft sections for transmitting power to the wheels, and the usual steering gear connections for actuating the wheels to direct the course of the vehicle. Fig. 2 is a front elevation, showing the relative vertical arrangement of the parts of the mechanism shown in Fig. 1. Fig. 3 is a sectional side elevation taken on dotted line 3—3 of Fig. 1. Fig. 4 is a vertical longitudinal sectional elevation taken on dotted line 4—4 of Fig. 1, showing the arrangement of the parts of the mechanism for transmitting the power from the engine shaft to the driven wheels.

Referring to the drawings by the characters of reference marked thereon, 1 designates the front axle, the body portion of which is preferably hollow, and which is provided at each end with an offset forked fitting or yoke 2 secured thereto in any suitable manner, the forked ends of which stand at an angle of approximately 45 degrees to the plane of the body of the axle. Entered between the forks of the yoke at each end of the axle is a hollow hub stem 3, and passing vertically through said forks and into the inner end of each of said hub stems in diametrically opposite directions are stud bolts 4, the heads of which engage the outer faces of their respective forks and are screw-threaded at their inner ends into said hub by means of which said stems are pivoted to swing in said fork ends in the arc of a horizontal circle, as shown in Figs. 1 and 4.

Journaled to rotate on each of the hollow stems 3 is a hub 5 of a vehicle wheel 6, and interposed between said hub and stem are suitable anti-friction bearings 7 on which said hub rotates, said hub being secured in the usual way by bolts 8 to the spokes 9 of the wheel. The inner end of each of the hubs is closed by an annular shoulder 10 on the hollow stem 3, and the outer end of said hub is closed by the usual hub cap 11. Extending through each of the hub stems 3 is a spindle 12, the inner end of which is journaled to rotate upon a suitable anti-friction bearing 13 mounted in the inner end of said hollow stem. The outer end of said spindle is squared or otherwise fitted to fixedly receive concentrically thereon a circular driving plate 14, the marginal edges of which may be rigidly secured to the outer end of the hub 5 by bolts or screws, or in any suitable manner to effect a driving engagement between said hub and spindle. The inner end of the spindle 12 is provided with an enlarged annular flange 15 which lies within the open inner end of the hollow stem 3, and is provided with an axial opening in which a coupling block 16 is fitted. Said block serves as the connecting member of a universal joint connection between the end of said spindle and one end of a shaft section 17, being pivotally connected with the flange of the spindle by studs 18 which extend diametrically therethrough and into said block, and having a transversely formed socket extending therethrough and pivotally receiving a T-headed fitting 19 formed on the end of the shaft section 17. Both pivotal connections of said coupling are centered to operate in the plane of the pivotal axis of the hub stem, and through which and the spindle 12 and its driving plate connecting with the hub 5 power is transmitted from the shaft sections 17 to the wheels 6 of the vehicle. (See Fig. 4).

The inner ends of the shaft sections 17 leading from each of the wheels may be connected by any suitable known form of universal coupling 20, each to the end of a stub shaft 21. These stub shafts 21 are journaled in axial alinement in bearings 22 formed in a two-part differential gear case 23 and are suitably connected at their inner ends within said case by the usual form of differential gearing 24, commonly employed in motor vehicles for transmitting and equalizing the power upon a two-piece driving shaft. In the present construction as shown in Figs. 3 and 4, the main driving member of the differential gearing is shown as a worm gear 25, which meshes with a driving worm 26 mounted on a sleeve 27 which is journaled to rotate in suitable bearings 28 supported in said gear case. The two parts of said case are secured together and to a transmission gear case 29 by bolts or other suitable means, and the transmission gear case is in turn suitably connected with the crank case 30 of an engine or motor 31. The sleeve 27 carrying the driving worm 26 extends into the gear case 29 and is connected for driving engagement through the usual transmission gears therein with the shaft 32 of the engine or motor. Said shaft is extended through the sleeve 27 of the driving worm and through the differential gear case 23 to a point accessible outside of said gear case for the attachment of a crank or other means for starting the motor.

The engine, together with its transmission and differential gear cases, may be mounted upon the vehicle frame 33 in any suitable manner, and the rear end of the frame may be supported upon the rear axle, not shown, by any suitable form of spring suspension. The forward cross member 34 of the frame, which is preferably formed of channel iron, is secured by binding clips 35 to the body of a semi-elliptical spring 36, which is embraced within the channel of said member. The ends of said springs are pivotally connected by links 37 to the ends of upwardly extending angular brackets 38 formed on each of the yokes 2 at the juncture of the ends of the axle 1 therewith. Said links are secured at their upper ends to their respective brackets by means of radius rods 39, each of which extends therethrough and is provided with jamb nuts 40 and 41, between which said links and brackets are confined to form a pivotal connection for the links and to anchor said rods at one end in said brackets. The opposite ends of the radius rods extend rearwardly upon opposite sides of the frame 33 and are each connected to a ball stud 42 projecting from the end of a trunnion 43 which is secured by bolts 44 to the engine bed, and also to the frame 33 by an embracing yoke 45 attached to said frame. The ball studs 42 are each seated in a socket formed in the body of the radius rod and serve as pivotal supports for said rods to connect and retain the frame and axle in the desired relation and permit of vertical movement of the frame through the action of the spring 36, as clearly shown in Figs. 1 and 2.

Extending from each of the hollow stems 3 is a steering arm 46 which is pivotally connected by a cross rod 47, and extending from one of said arms is a lever arm 48, to the outer end of which is pivoted an actuating rod 49 connected to a steering gear crank-arm 50, which is controlled by the usual steering gear mechanism, not shown, and by which movement of the front wheels is controlled to direct the course of the vehicle in the manner commonly employed for such purpose.

From the foregoing description of the construction and arrangement of the parts, the operation of the device will be understood to be as follows: It will be understood that the power of the engine or motor may be transmitted at the desired speed through any common form of planetary or sliding gear transmission contained in the gear case 29 and connected to the sleeve 27, through said sleeve and its driving worm 26 meshing with the main gear 25 of the differential gearing 24 in the gear case 23. Through said gearing and the stub shafts 21 connected therewith, the power is transmitted to and through the universally connected shaft sections 17 to the spindles 12 of the hub stems 3, and through the connecting plates 14 of said spindles to the hubs 5 of the wheels 6, thus driving said wheels and drawing the vehicle through the radius rods 39 connecting the frame 33 with the axle 1.

It will be noted that the shaft sections 27 are shown as set at a slight incline to a horizontal plane with the axle. This is done to compensate for the compression of the spring and the consequent settling of the frame under load, so that the shaft sections under normal conditions will lie substantially in axial alinement and in adjacent parallel relation to the axle. The relative movement of the frame and axle is accommodated by the universal joint connections of the shaft sections and the usual sliding connection of the stub shafts with the differential gears, which permits of a slight axial movement of said shafts to compensate for variations in the horizontal alinement of the shaft sections through the vertical movement of the frame and driving connections.

The turning of the wheels through the connecting rods of the steering mechanism is accomplished in the usual way, and it will be readily understood that as the hub stems are caused to swing in the arc of a horizontal circle concentric with their pivotal studs, this movement will be accommodated through the universal couplings connecting the shaft sections with the hub spindles, the axes of which, being alined with the pivotal axes of the hub stems, will permit the spindles and wheels to receive the driving power irrespective of the position in which they may stand. Owing to the fact that the front wheels are driven and are free to travel in any direction in which they may be turned, a greater tractive application of the power to the wheels and more ready response in directing the course of the vehicle is secured than is the case with rear driven wheels, as a change in the course of the vehicle will not depend upon angular resistance to deflect it through the turning of the wheels, but will readily follow the travel of the wheels under a tensile or drawing strain exerted upon the frame of the vehicle.

Having thus fully set forth my invention, what I claim as new, and desire to secure by Letters Patent, is:

1. In a driving mechanism for motor vehicles, a frame, a power unit combining engine, transmission and differential driving means mounted on said frame, an axle offset in a horizontal plane and having a hub stem pivoted to each end thereof, a wheel journaled on each hub stem, a spindle journaled in each hub stem and connected to the hub of said wheel, a spring interposed between said axle and said frame, power transmitting shafts connecting said driving means with each of said spindles to effect a driving engagement therewith and permit relative movement of said spindles and frame with said axle, and means yieldably connecting said axle and frame to retain said axle against rotation and permit of vertical movement of said frame.

2. In a driving mechanism for motor vehicles, an axle having a horizontally offset yoke at each end thereof, a hub stem pivoted to swing in each yoke, a wheel journaled to rotate on each hub stem, a spindle journaled in each hub stem and having a driving connection at one end with the hub of said wheel, a spring supported frame mounted on said axle, power transmitting means mounted on said frame, shaft sections each flexibly connected in driving engagement with said power transmitting means and with one of said spindles, and means rigidly attached to said axle and pivotally connected with said frame to retain said axle against rotation and permit of relative movement of said axle and frame.

3. In a driving mechanism for motor vehicles, a horizontally offset axle having forked ends, a hub stem pivoted to swing in each of said forked ends, a wheel journaled on each hub stem, a spindle journaled in each hub stem and connected to the hub of said wheel, a spring supported frame on said axle, differential gearing mounted on said frame, a power shaft carrying a driving worm in mesh with the main worm gear of said differential gearing, shaft sections each having universal coupling connections at one end with said differential gearing and universally coupled at the opposite end with one of said spindles at points in alinement with the pivotal axes of said hub stems, radius rods rigidly connected with said axle and pivoted to said frame, and manual steering mechanism for swinging said stems.

In testimony whereof I sign this specification in the presence of two witnesses.

CARL H. BLOMSTROM.

Witnesses:
B. F. WHEELER,
M. E. BROESAMLE.